July 22, 1952   F. RYDBERG   2,604,135
LOCKING DEVICE FOR THREADED MACHINE ELEMENTS
Filed May 3, 1948
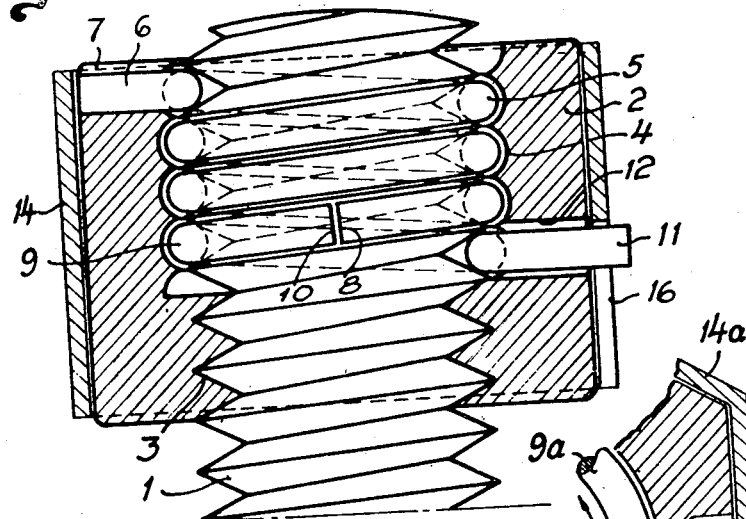
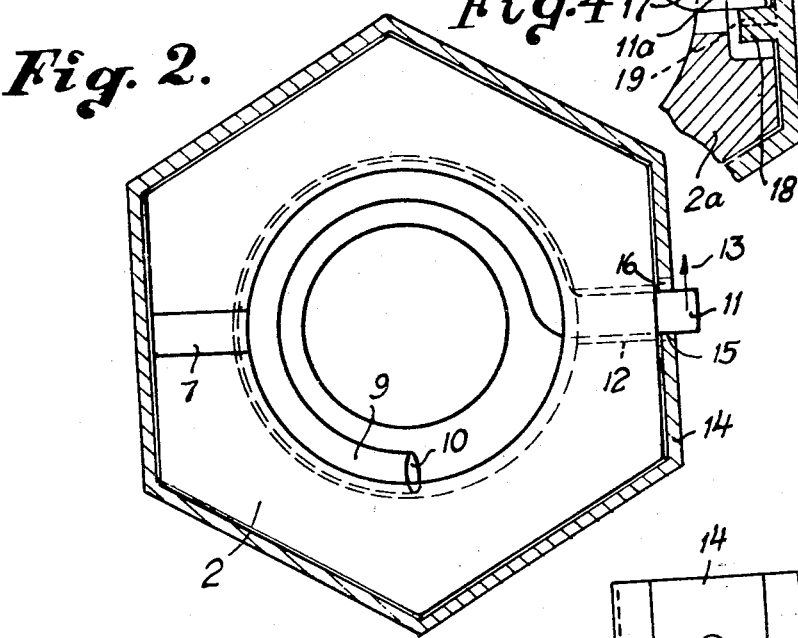
Inventor
Folke Rydberg
By Robert E. Burns
Attorney Patented July 22, 1952

2,604,135

UNITED STATES PATENT OFFICE 2,604,135

LOCKING DEVICE FOR THREADED MACHINE ELEMENTS

Folke Rydberg, Örebro, Sweden

Application May 3, 1948, Serial No. 24,844
In Sweden May 7, 1947

2 Claims. (Cl. 151—14)

This invention relates to a locking device for threaded machine elements, particularly bolts and nuts, comprising a helical spring arranged and inserted into an additional thread provided in the external element, of which additional thread extends through part of the length of the last named element, the outer end of the spring being retained in a recess in the external element.

If an effort is made to unscrew such a machine element, for instance a locking nut, unscrewing is prevented due to the fact that the spring will be compressed on account of the frictional contact with the bolt so as to lock the nut to the bolt.

Locking devices of the kind referred to suffer generally from the inconvenience that the nut cannot be unscrewed from the bolt without the spring becoming damaged and incapable of being used once more. Consequently, a fresh spring is required every time when the locking nut has been unscrewed.

The invention has for its object to provide a device by means of which the nut can be readily unscrewed without the locking spring, nut or bolt being damaged so that the locking device may be used without any alteration as many times as desired. I attain this object by mechanism described below with reference to the annexed drawing in which Fig. 1 is a longitudinal section of a locking device according to the invention; Fig. 2 is a top view of the device, the bolt and the locking spring being omitted; Fig. 3 shows to a reduced scale a sleeve adapted to be mounted on the nut to facilitate unscrewing; and Fig. 4 shows part of a sectional view of a modified embodiment of such a sleeve.

Referring to the drawing, numeral 1 indicates a threaded bolt and numeral 2 a nut screwed onto the bolt. The nut has a thread 3 fitting the bolt thread, and an additional thread 4 of greater diameter. The additional thread extends over a portion only of the length of the nut.

In the thread 4 is inserted a helical locking spring 5 the outer end 6 of which is retained in a radial groove 7 provided in the nut 2. The inner end of the locking spring is indicated at 8.

Below the locking spring 5 there is provided a wire 9 preferably consisting of resilient material and extending in the additional thread 4 through an angle of at least 180°. The inner end 10 of the wire 9 is normally located at a slight distance from the inner end 8 of the locking spring or may normally contact the end 8 without exerting a pressure thereon. The outer end 11 of the wire 9 extends substantially radially through an opening 12 in the nut 2 so that said end 11 can be actuated from the outside.

Normally, unscrewing of the nut is prevented by the locking spring 5. If, however, a force acting in the direction of the arrow 13 (Fig. 2) is applied to the outwardly bent end 11 of the wire 9, the wire will be turned within the thread 4 and its inner end 10 will be forced against the inner end 8 of the locking spring 5 so as to expand the spring with the result that the nut can be unscrewed.

The force acting on the end 11 of the wire may be applied manually, such as by a finger, or by means of a suitable tool.

In Figs. 1, 2 and 3 there is illustrated an example of such a tool for exerting a turning movement on the wire and consisting of a hexagonal sleeve 14 adapted to be axially slid onto the nut 2. The sleeve has an oblique recess 16. The face 15 of this recess will turn the wire 9 in an anti-clockwise direction as viewed in Fig. 2 and thereby force the end 10 of the wire against the end 8 of the locking spring.

The sleeve 14 may be formed as a socket-wrench having a recess 16. It will be obvious that a single sleeve 14 or similar member can be used for all nuts having the same span of jaw.

If it is not desired to have the outer end of the wire extend outside the nut as shown in Figs. 1 and 2, the wire may be shortened as illustrated in Fig. 4 in which the end of the wire is indicated at 11a. In this case, a recess 17 is provided in the nut 2a. The sleeve or similar tool 14a has an internal projection 18 provided with an oblique face 19 which when the sleeve 14a is slid onto the nut will cause the same turning movement of the wire 9a as in the previous embodiment.

The sleeve 14 or 14a should be dimensioned such as to be able to be engaged by a wrench or spanner of standard type.

In the above description it is assumed that the bolt and nut are provided with right-handed threads. If the threads are left-handed, the direction of the movements will be opposite to those indicated above.

What I claim is:

1. In combination, a first machine element having an external screw thread, a second machine element having a first internal screw thread constructed and arranged to fit said external screw thread and a second continuous internal screw thread having a greater diameter than said first internal thread and forming a coaxial continuation thereof, said second element having a groove in one of its end faces, a helical locking spring threaded into said second internal thread so as to surround and resiliently grip part of said external thread with the possibility of slight radial expansion, one end of said spring being bent outwards and fixed in said groove, the other end of said spring being located within said second internal thread at a distance from said first internal thread, a circumferentially elongated radial opening in said second element, a helically shaped member inserted in said second internal thread and forming an elongation of said spring, and extending through an angle of more than 180° in said second internal thread, the outer end of said member extending through said opening in said second element, said member being movable upon the external screw thread and the inner end of said member substantially abutting and being constructed and arranged to be forced against the inner end of said spring to expand same, a sleeve constructed and arranged to be axially mounted on said second element and having a face located obliquely with respect to the axis of said threads, said face being arranged to impart to the outer end of said member a circumferential movement whereby to force the inner end of said member against said other end of said spring.

2. A machine element as described in claim 1, wherein the sleeve has the same configuration as the nut.

FOLKE RYDBERG.

REFERENCES CITED

The following references are of record in the file of this patent:

UNITED STATES PATENTS

| Number | Name | Date |
|---|---|---|
| 900,589 | Ratcliffe | Oct. 6, 1908 |
| 926,517 | Terry | June 29, 1909 |
| 1,189,081 | Fitzgerald | June 27, 1916 |
| 1,630,958 | Mauch | May 31, 1927 |

FOREIGN PATENTS

| Number | Country | Date |
|---|---|---|
| 899,690 | France | June 7, 1945 |